Sept. 9, 1952 R. E. GETCHELL 2,609,568
APPARATUS AND METHOD OF EMBOSSING THERMOPLASTIC SHEETS
Filed Oct. 20, 1950
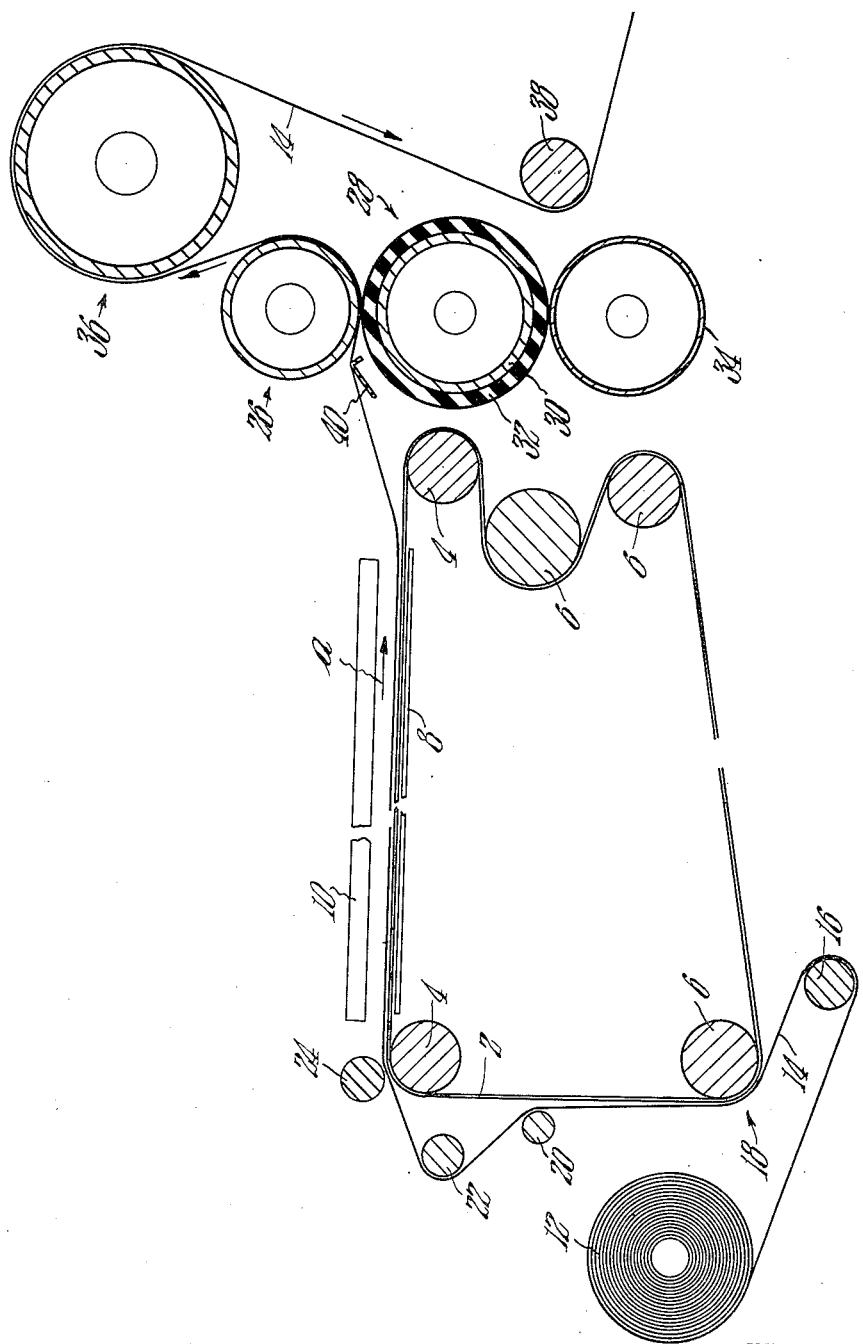
INVENTOR.
Raymond E. Getchell.
BY Ross, Ross
Atty. & Agent Patented Sept. 9, 1952

2,609,568

UNITED STATES PATENT OFFICE 2,609,568

APPARATUS AND METHOD OF EMBOSSING THERMOPLASTIC SHEETS

Raymond E. Getchell, Holyoke, Mass., assignor to B. F. Perkins & Son, Inc., Holyoke, Mass., a corporation Application October 20, 1950, Serial No. 191,222

2 Claims. (Cl. 18—10)

My invention relates to improvements in embossing methods and apparatus therefor and is directed more particularly to embossing plastic sheet materials of various kinds such as rubber, polymers and copolymers of vinyl acetate, vinyl chloride, polyethylene, and the like.

The principal objects of my invention are directed to the provision of a continuous method of and apparatus for forming an ornamental decorative surface finish on unsupported sheet plastic material.

It has been ordinary practice to emboss supported plastic sheet material, i. e. a sheet of plastic covered or supported by a sheet of fabric or the like. However, considerable difficulty has been experienced in embossing unsupported plastic sheet material.

One of the difficulties has been that since the sheet material is heated for softening so as to facilitate the embossing operation, wrinkles are developed which result in spoiled work and obvious wastes of material.

According to my invention, the novel method and the apparatus for accomplishing the method eliminate the possibility of wrinkles and overcome the objections in prior art methods and apparatus to the end that a uniform, suitably embossed product is produced without the aforementioned waste and at a high rate of production.

It is another object of my invention to produce desired surface effects upon thermoplastic sheet material continuously and with maximum efficiency.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

The figure is a diagrammatic view showing the elements of apparatus for the method of the invention.

An endless carrier belt or band is represented by 2 and is supported by rolls 4 and 6. This band has been found to be adapted for the practice of the invention when formed from woven asbestos material. One or more of the rolls may be driven to bring about continuous movement of the band at the desired lineal speed in the direction of arrow $a$.

Intermediate the rolls 4 the band is supported by a supporting plate or bed 8 which is substantially rigid.

Above the band 2 and between the rolls 4 there is a heater indicated by 10. This heater may take any desired form adapted to direct heat onto the band. The heater may include electrical resistance coils, steam coils or the like arranged and adapted to radiate heat at the desired temperature.

The material to be embossed may take various forms but in the present disclosure reference is made to sheet vinyl which is heated to a temperature of approximately 300° F.

A roll of plastic sheet material is represented by 12 and the web 14 therefrom extends over a guide roll 16 into contact with the band 2 at 18, over a bar 20 and an expander or spreading roll 22, thence onto the band and beneath a press roll 24.

The band 2 in the operation of the apparatus is in heated condition so that the web 14 as it contacts the band at 18 absorbs heat.

The roll 22 is formed to cause the web to be urged outwardly transversely in opposite directions from its longitudinal center and may be crowned or otherwise formed in some well known manner for that purpose, thereby to smooth the web and eliminate wrinkles.

The roll 24 is such as will press on the web sufficiently to cause it to adhere to the band so that it is carried forwardly by the band in the direction of arrow $a$ without stretching or distortion.

The web, being smoothed laterally by roll 22, is in a flat and smooth condition on the band and in being carried forwardly is uniformly heated to the desired temperature for the embossing operation.

A hollow embossing roll is represented by 26 which may be a metal roll having an engraved surface configuration such as will provide the desired embossing on the sheet.

A cooperating roll is indicated by 28 and includes a hollow metal body 30 having a yieldable covering 32.

The covering may be formed from rubber or similar suitable material adapted to back up the embossing roll as its characteristics are formed in the web of plastic material.

A hollow cooling roll 34 is provided for rolling contact with the cooperating roll 28.

The embossing roll 26 may be driven at the desired speed and the desired pressure may be applied thereto in some well known manner for the embossing operation between rolls 26 and 28. That is, the rolls 26 and 28 may be arranged to apply the desired pressure to the roll.

The roll 34 need not be driven unless desired and may be rotated simply through its contact with roll 28.

A hollow metal cooling drum 36 is provided above the embossing roll 26 and a lower guide roll 38 may be disposed therebelow as shown.

A transverse smoothing member 40 is disposed adjacent the bite of rolls 26 and 28. This will preferably be in the form of an angle having a heel over which the web 14 passes from the band 2.

It will be understood that the rolls and band will be operated for continuous movement of the plastic web from the roll 12 through the apparatus.

As the web is carried along beneath the heater 10, it is heated to the desired temperature to soften it for the embossing operation. As it passes over the member 40 to the bite of rolls 26 and 28, it leaves the band 2 and said member 40 functions to maintain the smoothness and retain the unwrinkled, undistorted condition of the web for the embossing thereof.

The rolls 26, 28, 34 and 36 being hollow they are cooled by the circulation therethrough of a cooling medium such as water through an end of the rolls in the well known manner.

The web being heated so as to soften it for the embossing operation, the embossing roll 26 and cooperating roll provide the embossed effect according to the surface configuration of roll 26.

The web is kept smooth and unwrinkled by the member 40 so that it is in the desired condition for embossing and the rolls 26 and 28 being cooled as they are and aided by the roll 34, the web is simultaneously embossed and cooled and subsequently further cooled by roll 36 so as to pass over roll 38 and be rewound by suitable rewinding mechanism.

The cooling of rolls 28 and 26 will not be such as will unfavorably effect the embossing operation but will function to set or harden the relatively soft web and preserve the embossing effect. Without cooling the material having been softened by heat, it has an inherent tendency to flow to some extent and without any cooling the embossing could be impaired.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. The method of embossing a continuous web of normally unsupported plastic material having a tendency to deform and wrinkle when heated which consists in, supporting and conveying said web on an elongated flexible rigidly supported run of an endless band past elongated heating means to soften the surface of the web for embossing, leading said web from said band over a rigid smoothing member disposed transversely to the movement of said web for smoothing said web transversely and eliminating wrinkles while softened and then between a rigid embossing roll and a yieldable faced roll cooperating therewith and finally around a cooling roll for cooling said embossed web.

2. Apparatus for embossing a continuous web of relatively thin normally unsupported plastic material comprising in combination, an endless flexible band, a plurality of rolls for supporting said band relatively disposed to provide a horizontal elongated run for supporting and conveying said web, a flat elongated rigid support for supporting said horizontal run and having a delivery end, heating means disposed along said run and spaced thereabove for the passage thereunder of a web carried by said run, a transverse rigid smoothing member disposed at the delivery end of said support for the passage of a web from the run of said band thereover, coacting embossing and yieldable faced rolls adjacent said smoothing member for receiving said web from said smoothing member, and a cooling roll for receiving and cooling said web from said embossing and yieldable faced roll.

RAYMOND E. GETCHELL.

REFERENCES CITED

The following references are of record in the file of this patent:

UNITED STATES PATENTS

| Number | Name | Date |
| --- | --- | --- |
| 2,175,337 | Boice | Oct. 10, 1939 |
| 2,218,227 | Winnek | Oct. 15, 1940 |
| 2,318,111 | Steinberger | May 4, 1943 |
| 2,442,443 | Swallow | June 1, 1948 |